(12) United States Patent
Imai et al.

(10) Patent No.: US 9,001,075 B2
(45) Date of Patent: Apr. 7, 2015

(54) DISPLAY DEVICE WITH TOUCH PANEL FUNCTION

(71) Applicants: Takayuki Imai, Saitama-ken (JP); Hideyuki Takahashi, Saitama-ken (JP); Hirofumi Kato, Saitama-ken (JP); Jun Hanari, Saitama-ken (JP); Atsunori Ooyama, Saitama-ken (JP)

(72) Inventors: Takayuki Imai, Saitama-ken (JP); Hideyuki Takahashi, Saitama-ken (JP); Hirofumi Kato, Saitama-ken (JP); Jun Hanari, Saitama-ken (JP); Atsunori Ooyama, Saitama-ken (JP)

(73) Assignee: Japan Display Inc., Tokyo (JP)

( * ) Notice: Subject to any disclaimer, the term of this patent is extended or adjusted under 35 U.S.C. 154(b) by 227 days.

(21) Appl. No.: 13/651,657

(22) Filed: Oct. 15, 2012

(65) Prior Publication Data

US 2013/0162590 A1    Jun. 27, 2013

(30) Foreign Application Priority Data

Dec. 21, 2011    (JP) .................................. 2011-280425

(51) Int. Cl.
*G06F 3/045* (2006.01)
*G09G 3/30* (2006.01)
*G09G 3/36* (2006.01)
*G06F 3/041* (2006.01)
*G06F 3/044* (2006.01)

(52) U.S. Cl.
CPC ...................................... *G06F 3/044* (2013.01)

(58) Field of Classification Search
CPC ...................... G06F 3/0412; G09G 2310/0251
USPC ............................. 345/87–101, 173–178, 76
See application file for complete search history.

(56) References Cited

U.S. PATENT DOCUMENTS

| 7,265,740 | B2 | 9/2007 | Tada et al. | |
|---|---|---|---|---|
| 7,876,303 | B2 * | 1/2011 | Moon et al. | 345/100 |
| 2005/0280613 | A1 * | 12/2005 | Takei et al. | 345/76 |
| 2008/0191987 | A1 * | 8/2008 | Lee et al. | 345/92 |
| 2012/0044176 | A1 * | 2/2012 | Nakamura et al. | 345/173 |

OTHER PUBLICATIONS

U.S. Appl. No. 13/525,507, filed Jun. 18, 2012, Masahiro Tada et al.

* cited by examiner

*Primary Examiner* — Vijay Shankar
*Assistant Examiner* — Amit Chatly
(74) *Attorney, Agent, or Firm* — Oblon, McClelland, Maier & Neustadt, L.L.P.

(57) ABSTRACT

A display device having a touch panel function includes a plurality of pixel circuits arranged in a matrix shape and sensing circuits arranged in a region between the adjacent pixel circuits for reading out a magnitude of coupling capacitance. A display driver writes a display signal in the pixel circuit every row line by driving the scanning lines and signal lines in a display operation period. A sensing driver senses a signal showing magnitude of the coupling capacitance from the sensing circuit every row line by driving the plurality of scanning lines and signal lines in a sensing operation period. The display operation period and the sensing operation period are repeated in turns. A voltage in a range used for the displaying operation is written into the signal line in a preliminary writing operation period between after the sensing operation period and before the display operation period.

10 Claims, 11 Drawing Sheets

DISPLAY DEVICE WITH TOUCH PANEL FUNCTION

CROSS-REFERENCE TO RELATED APPLICATION

This application is based upon and claims the benefit of priority from prior Japanese Patent Application No. 2011-280425, filed Dec. 21, 2011, the entire contents of which are incorporated herein by reference.

FIELD

Embodiments described herein relate generally to a display device with a touch panel function.

BACKGROUND

In recent years, electronic devices having a display panel provided with a touch panel function are developed as a user interface, such as a cellular phone, a Personal Digital Assistant (PAD), and a personal computer. In the electronic devices equipped with the touch panel function, it is studied to provide the touch panel function by attaching a touch panel substrate independently produced from the display panels, such as a liquid crystal display panel and an organic electroluminescence display panel.

Moreover, in a display device having scanning lines and signal lines, a technology of manufacturing the display device with sensor elements is researched.

Moreover, as a sensing system for reading images, a technology, i.e., a capacitance sensor system is studied to detect a contact position on the surface of the display panel by a fingertip or a nib, in which a detection electrode is provided in place of an electrical optical sensor element, and an information of the contact position is detected by a capacitance change between the electrode and the finger, etc.

In the display device using a capacitance sensor system, an in-cell technology, in which the sensing function is incorporated into the display panels such as the liquid crystal display panel, is developed briskly. By the way, when the touch panel function is realized by building a sensing circuit in the substrate forming the display panel for detecting a contact position on the substrate which constitutes the display panel, degradation of the display grace may occur because both the display function and the sensing function share a portion of circuits thereof.

For example, in the display device with an input function provided with the sensing circuit and the display circuit, some signal lines arranged in a vertical direction are shared in the sensing circuit and the display circuit, and a reading operation of the sensing circuit and the display operation are performed by time sharing. Therefore, at a time between after the reading operation of the sensing circuit and right before the starting of the display operation, the signal for the reading operation of the sensing circuit is written in the signal line. Since this state differs from that of the signal line in the case of repeating the usual display operation, the display immediately after the sensing operation is affected, and display grace deteriorates.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
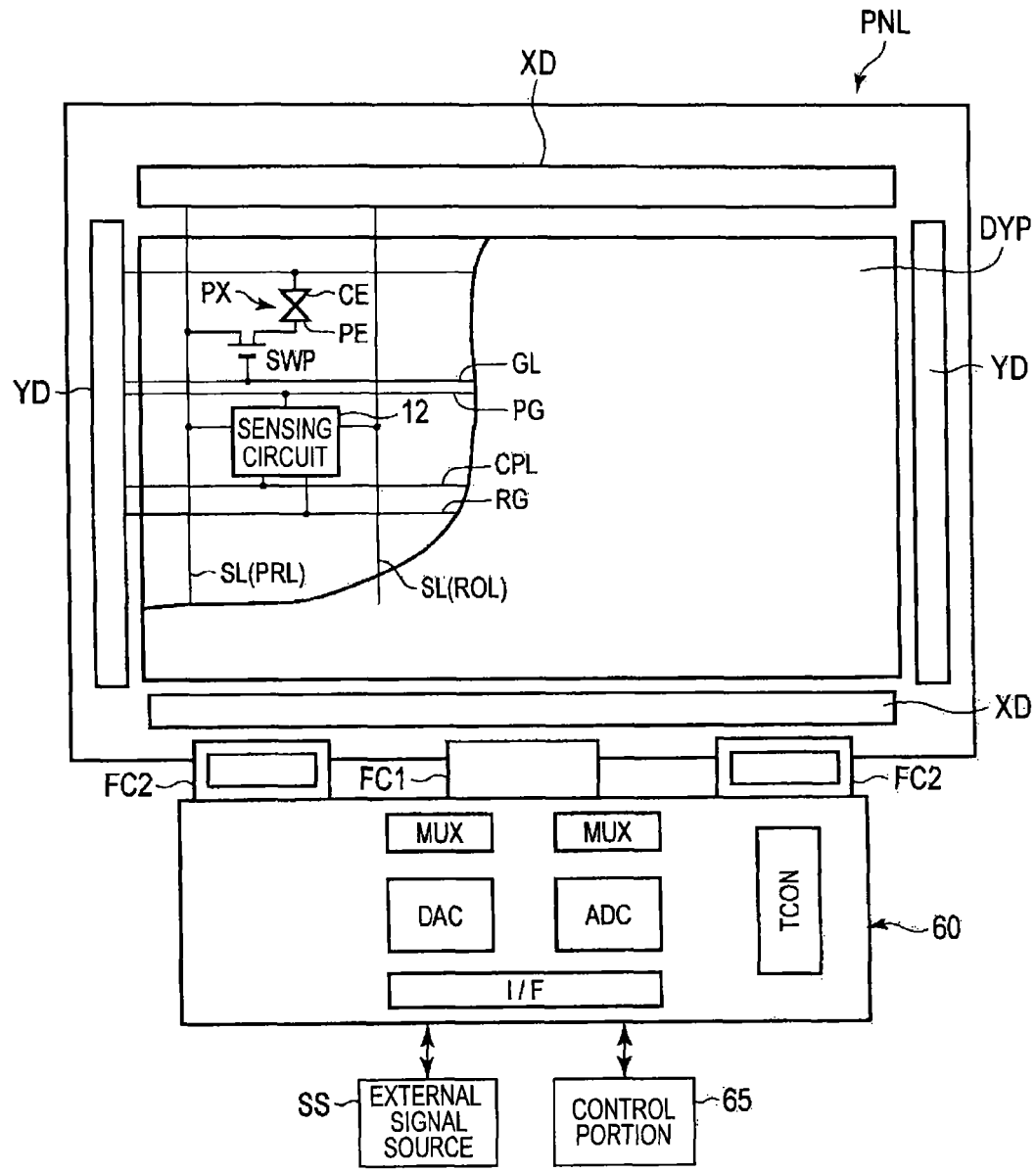
FIG. 1 is a plan view schematically showing a structure of a display device according to an embodiment.

A display device with a touch panel function according to an exemplary embodiment of the present invention will now be described with reference to the accompanying drawings wherein the same or like reference numerals designate the same or corresponding portion s throughout the several views.

According to one embodiment, a display device having a touch panel function includes: a plurality of pixel circuits arranged in a matrix shape; a plurality of sensing circuits arranged in a region between the adjacent pixel circuits for reading out a magnitude of coupling capacitance; a plurality of scanning lines arranged in a row direction along which the plurality of pixel circuits extends for use of the pixel circuits and the sensing circuits; a plurality of signal lines arranged in a column direction along which the plurality of pixel circuits extends for use of the pixel circuits and the sensing circuits, some of the signal lines being commonly used for the pixel circuits and the sensing circuits; a display driver for writing a display signal in the pixel circuit every row line by driving the plurality of scanning lines and signal lines in a display operation period; a sensing driver for sensing a signal showing magnitude of the coupling capacitance from the sensing circuit every row line by driving the plurality of scanning lines and signal lines in a sensing operation period; and a control portion for controlling the display driver and the sensing driver wherein while the display operation period and the sensing operation period are repeated in turns, a voltage in a range used for the displaying operation is written into the signal line in a preliminary writing operation period between after the sensing operation period and before the display operation period.

FIG. 1 is a plan view schematically showing the structure of the display device according to this embodiment. The display device 1 according to this embodiment is equipped with a liquid crystal display panel PNL and a circuit substrate 60. Ends of respective flexible substrates FC1 and FC2 are electrically connected to an end of the liquid crystal display panel PNL. The circuit substrate 60 is electrically connected with the other end of the flexible substrates FC1 and FC2.

The liquid crystal display panel PNL is equipped with a display area DYP which consists of a plurality of pixels arranged in the shape of a matrix, a scanning line driving circuit YD and a signal line driving circuit XD arranged around the display area DYP. The circuit substrate 60 controls the sensing circuit (to be mentioned later) provided in the liquid crystal display panel PNL while controlling the display operation of the display device. That is, the circuit substrate 60 outputs image signals acquired from an external signal source SS to the liquid crystal display panel PNL. Moreover, the circuit substrate 60 outputs output signals acquired from the sensing circuit to a control portion 65 while supplying signals which operate the sensing circuit.

Figure 2:
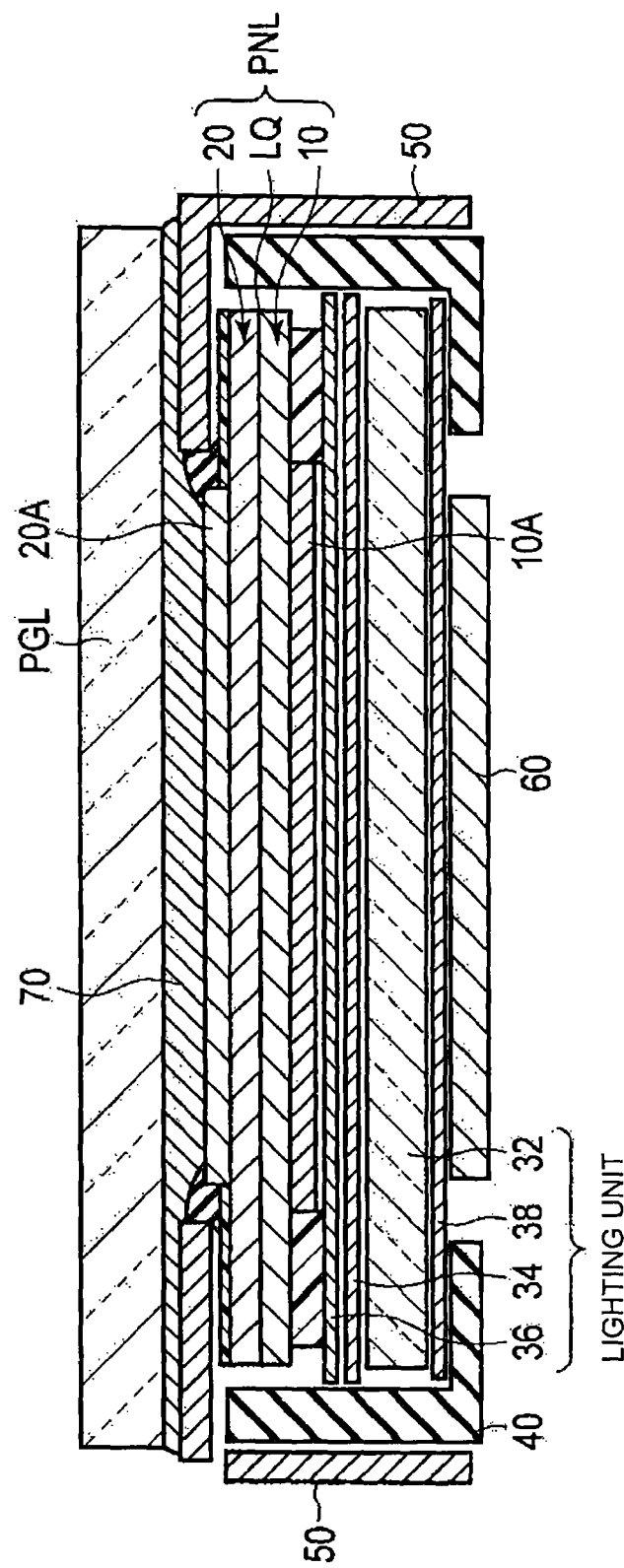
FIG. 2 is a figure showing a cross section of the display device according to the embodiment.

FIG. 2 is a figure showing a cross section of the display device according to this embodiment. The display device 1 according to this embodiment is equipped with the liquid crystal display panel PNL, a lighting unit, a frame 40, a bezel cover 50, the circuit substrate 60, and a protection glass PGL.

The lighting unit is arranged on the back side of the liquid crystal display panel PNL. The frame 40 supports the liquid crystal display panel PNL and the lighting unit. The bezel cover 50 is attached to the frame 40 so that the display area DYP of the liquid crystal display panel PNL may be exposed. The circuit substrate 60 is arranged on the back side of the frame 40. The protection glass PGL is fixed on the bezel cover 50 by adhesives 70.

The liquid crystal display panel PNL is equipped with an array substrate 10, a counter substrate 20 facing the array substrate 10, and a liquid crystal layer LQ held between the array substrate 10 and the counter substrate 20. The array substrate 10 is equipped with a polarizing plate 10A attached to a principal surface opposite to the liquid crystal layer LQ. The counter substrate 20 is equipped with a polarizing plate 20A attached to a principal surface opposite to the liquid crystal layer LQ.

The lighting unit is equipped with a light source which is not illustrated, a light guide plate 32, a prism sheet 34, a diffusion sheet 36, and a reflective sheet 38. The light guide plate 32 emits light which entered from the light source toward the liquid crystal display panel PNL side. The prism sheet 34 and the diffusion sheet 36 are optical sheets arranged between the liquid crystal display panel PNL and the light guide plate 32. The reflective sheet 38 is arranged so that the reflective sheet 38 may counter with the principal surface of the light guide plate 32 opposite to the liquid crystal display panel PNL. The prism sheet 34 and the diffusion sheet 36 condense and diffuse the light emitted from the light guide plate 32.

The protection glass PGL protects the display area DYP of the liquid crystal display panel PNL from shock from outside. In addition, the protection glass PGL may be eliminated.

Then, the display device shown in FIG. 1 is explained in detail.

The liquid crystal display panel PNL is constituted by holding the liquid crystal layer LQ between the array substrates 10 and the counter substrate 20, which are electrode substrates. The transmissivity of the liquid crystal display panel PNL is controlled by a liquid crystal driving voltage impressed to the liquid crystal layer LQ from the pixel electrode PE provided in the array substrate 10 and the common electrode CE provided in the counter substrate 20.

In the array substrate 10, a plurality of pixel electrodes PE is arranged approximately in the shape of a matrix on a transparent insulating substrate (not illustrated). Moreover, a plurality of gate lines GL is arranged along with row lines of the plurality of pixel electrodes PE, and a plurality of signal lines SL is arranged along with column lines of the plurality of pixel electrodes PE.

Each of the pixel electrodes PE and the common electrodes CE is formed of transparent electrode materials such as ITO (Indium Tin Oxide), and are covered by an alignment film AL, respectively. The pixel electrode PE and the common electrode CE constitute a liquid crystal pixel PX with the liquid crystal layer LQ.

In the vicinity of the intersection position of the gate line GL and signal line SL, a plurality of pixel switches SWP is arranged. Each pixel switch SWP is formed of a thin film transistor (TFT), for example. A gate electrode is connected to the gate line GL, a source-drain pass is connected between the signal line SL and the pixel electrode PE. When the pixel electrode PX is driven through the corresponding gate line GL, an electrical connection is formed between the corresponding signal line SL and the corresponding pixel electrode PE.

Furthermore, a sensing circuit 12 is provided in the array substrate 10, and a coupling pulse line CPL, a precharge gate line PG, and a reading-out gate line RG for driving the sensing circuit 12 are arranged along with the row line of the plurality of pixel electrodes PE. In addition, in this embodiment, the signal line SL is used also as a precharge line PRL which supplies the signal which drives the sensing circuit 12, and the reading-out line ROL. The detailed operation is mentioned later.

The scanning line driving circuit YD supplies a gate voltage for turning on the pixel switch SWP to the plurality of gate lines GL (the electrical connection of the source-drain pass is formed), and drives the gate lines GL one by one. Moreover, the scanning line driving circuit YD drives a plurality of coupling pulse lines CPL, precharge gate lines PG, and reading-out gate lines RG at a predetermined timing, and makes the sensing circuit 12 drive.

The signal line driving circuit XD supplies image signals to the pixel electrode PE from the signal line SL through the pixel switch SWP in which a source-drain pass is formed.

Moreover, a common electrode driving circuit (not shown) supplies a common voltage Vcom to the common electrode CE. The common electrode driving circuit inverts the polarity of the common voltage Vcom supplied to the common electrode CE, if needed, and inverts the polarity of the voltage impressed to the liquid crystal layer LQ so that the display device 1 may correspond to a polarity-inversion system of the display device 1.

The circuit substrate 60 is equipped with a multiplexer MUX, a D/A conversion portion DAC, an A/D conversion portion ADC, an interface portion I/F, and a timing controller TCONT.

The timing controller TCONT controls the operations of each device provided in the circuit substrate 60, the scanning line driving circuit YD, the signal line driving circuit XD, the common electrode driving circuit, and the sensing circuit 12.

The digital image signal taken into the circuit substrate 60 from the external signal source SS through the interface portion I/F is converted into an analog signal by the D/A conversion portion DAC, and is outputted to the signal line SL by the multiplexer MUX at a predetermined timing.

The output signal from the sensing circuit 12 is supplied to the A/D conversion portion ADC by the multiplexer MUX at a predetermined timing, and is converted into digital signals. The digital signal is supplied to the interface portion I/F. The interface portion I/F outputs the received digital signal to the control portion 65. The control portion 65 performs coordinate calculation by the received digital signal, and detects a coordinate position where a fingertip, a nib, etc., contacted.

Figure 3:
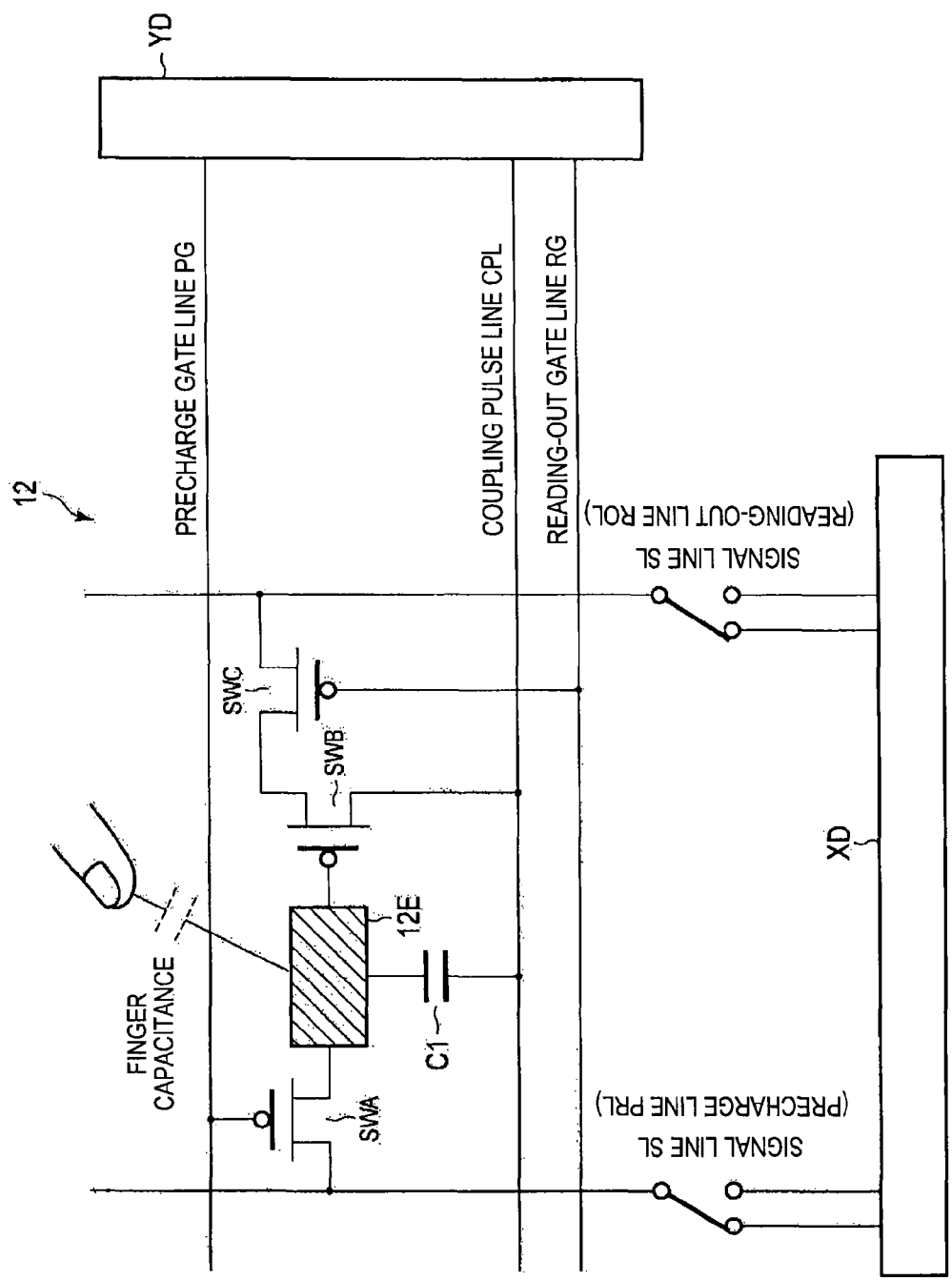
FIG. 3 is a figure showing an equivalent circuit of a sensing circuit according to the embodiment.

FIG. 3 is a figure showing an equivalent circuit of the sensing circuit 12 according to this embodiment. The sensing circuit 12 includes a detection electrode 12E, a precharge line PRL, a reading-out line ROL, a precharge gate line PG, a coupling pulse line CPL, a reading-out gate line RG, a precharge switch SWA, a coupling capacitance C1, an amplification switch SWB, and a reading-out switch SWC.

The detection electrode 12E detects change of the detection capacitance by contact or non-contact by a contact object. The precharge line PRL supplies a precharge voltage to the detection electrode 12E. The reading-out line ROL takes out the voltage of the detection electrode 12E. The precharge gate line PG, the coupling pulse line CPL, and the reading-out gate line RG supply the signals for driving the operation of the sensing circuit 12.

The precharge switch SWA is a switch for writing and holding a precharge voltage in the detection electrode 12E. The coupling capacitance C1 produces the voltage difference by change of the detected capacitance in the detection electrode 12E. The amplification switch SWB is a switch for amplifying the voltage difference produced in the detection electrode 12E. The reading-out switch SWC reads the amplified voltage difference, and outputs it to the reading-out line ROL and holds.

The precharge line PRL and the reading-out line ROL use common lines with the signal line SL. In addition, since one sensing circuit 12 is arranged in a plurality of pixels PX, some of the signal lines SL are shared.

The precharge switch SWA is formed of a p type thin film transistor, for example. A gate electrode is electrically connected with the precharge gate line PG (or integrally constituted), a source electrode is electrically connected with the precharge line PRL (or integrally constituted), and the drain electrode is electrically connected with the detection electrode 12E (or integrally constituted).

The amplification switch SWB is formed of a p type thin film transistor, for example. A gate electrode is electrically connected with the detection electrode 12E (or integrally constituted), a source electrode is electrically connected with the coupling pulse line CPL (or integrally constituted), and the drain electrode is electrically connected with the source electrode of the reading-out switch SWC (or integrally constituted).

The reading-out switch SWC is formed of a p type thin film transistor, for example. The gate electrode is electrically connected with the reading-out gate line RG (or integrally constituted), the source electrode is electrically connected with the drain electrode of the amplification switch SWB (or integrally constituted), and the drain electrode is electrically connected with the reading-out line ROL (or integrally constituted).

Figure 4:
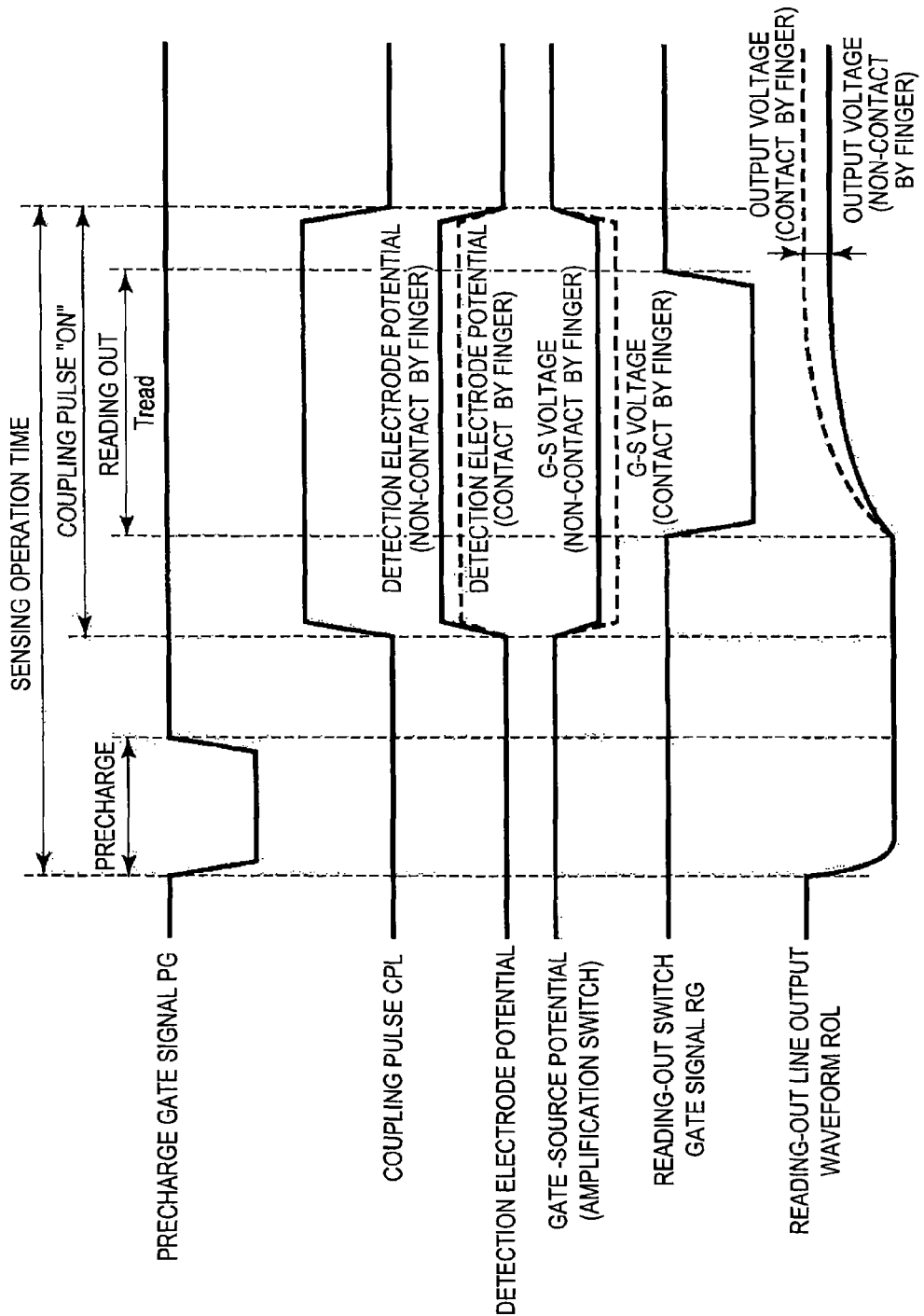
FIG. 4 is a timing chart showing an example of a driving method of the display device according to the embodiment.

FIG. 4 is a timing chart showing an example of the driving method of the display device 1 according to this embodiment.

A precharge gate line driving signal (precharge gate signal) is impressed to the precharge gate line PG, and is inputted into the gate electrode terminal of the precharge switch SWA. As a result, at the timing when the prechrge pulse is ON level (low level), a precharge voltage Vprc is written in the detection electrode 12E from the precharge line PRL through the precharge switch SWA.

A coupling pulse line driving signal is impressed to the coupling pulse line CPL, and the potential of the detection electrode 12E is fluctuated depending on contact or non-contact by a contact object through the coupling capacitance C1. The detection electrode potential waveform shows potential change of the detection electrode 12E, and can produce a voltage difference between detection electrode potential (non-contact by finger) and detection electrode potential (contact by finger).

A voltage waveform between gate-source (GS) of the amplification switch SWB shows that the voltage difference produced with the detection electrode 12E is reflected to the difference of the operating point of the amplification switch SWB. The voltage difference arises between the gate-source (GS) voltage (no contact by finger) and the gate-source (GS) voltage (contact by finger). A reading-out gate line driving signal is impressed to the reading-out gate line RG, and is inputted to the gate electrode terminal of the reading-out switch SWC.

As a result, the potential of the coupling pulse after fluctuation is outputted to the reading-out line ROL through the amplification switch SWB and the reading-out switch SWC at a timing when the pulse impressed to the reading-out gate line RG is an ON level. The voltage waveform outputted to the reading-out line ROL shows the voltage fluctuation, and a voltage difference is produced between the output voltage (contact by finger) and the output voltage (non-contact by finger).

When driving the sensing circuit 12, firstly, the timing controller TCON controls the scanning line driving circuit YD so that the precharge switch SWA is turned on by setting the voltage impressed to the precharge gate line PG to a low (L) level. The timing controller TCON controls the signal line driving circuit XD so as to impress the precharge voltage to the precharge line PRL and to impress the precharge voltage to the detection electrode 12E through the switch SWA.

Next, the timing controller TCON sets the coupling pulse line CPL to the high (H) level by controlling the scanning line driving circuit YD after making the precharge switch SWA turn off. When the coupling pulse changes from the low level to the high level, a voltage is superimposed on the potential of the detection electrode 12E with the coupling capacitance C1. At this time, the magnitude of the voltage which is superimposed to the detection electrode 12E is determined by the capacitance between the detection electrode 12E and the contact object.

For example, when a finger, a nib, etc., touch the counter substrate 20 above the detection electrode 12E, capacitance is generated between the detection electrode 12E and the finger. When the finger tip, the nib, etc., touch the counter substrate above the detection electrode 12E, the magnitude of the voltage which is superimposed on the detection electrode 12E becomes smaller compared with the case where there is neither the fingertip nor the nib.

ON resistance of the amplification switch SWB differs depending on the potential of the detection electrode 12E. According to this embodiment, when the fingertip, the nib, etc., touch above the detection electrode 12E, the ON resistance of the amplification switch SWB falls, and when neither the fingertip nor the nib touches above the detection electrode 12E, the ON resistance of the amplification switch SWB becomes comparatively high.

Next, the timing controller TCON controls the scanning line driving circuit YD, and makes the reading-out switch SWC turn on by setting the voltage of the reading-out gate line RG to the low level. When the fingertip, the nib, etc., touch above the detection electrode 12E, if the reading-out switch SWC turns on, the coupling pulse is supplied to the reading-out line ROL through the amplification switch SWB and the reading-out switch SWC.

Therefore, when the fingertip, the nib, etc., touch above the detection electrode 12E, the potential of the reading-out line ROL changes toward the coupling pulse potential. When neither the fingertip nor the nib touches, the change of the potential of the reading-out line ROL becomes small compare with the case where the fingertip, the nib, etc., touch above the detection electrode 12E.

Then, it becomes possible to detect the position where the finger tip, the nib, etc., touch by detecting the output voltage difference between the output voltage (contact by finger) and the output voltage (non-contact by finger) at the time when an output period Tread has passed after the reading-out gate line PG turned on.

Figure 5:
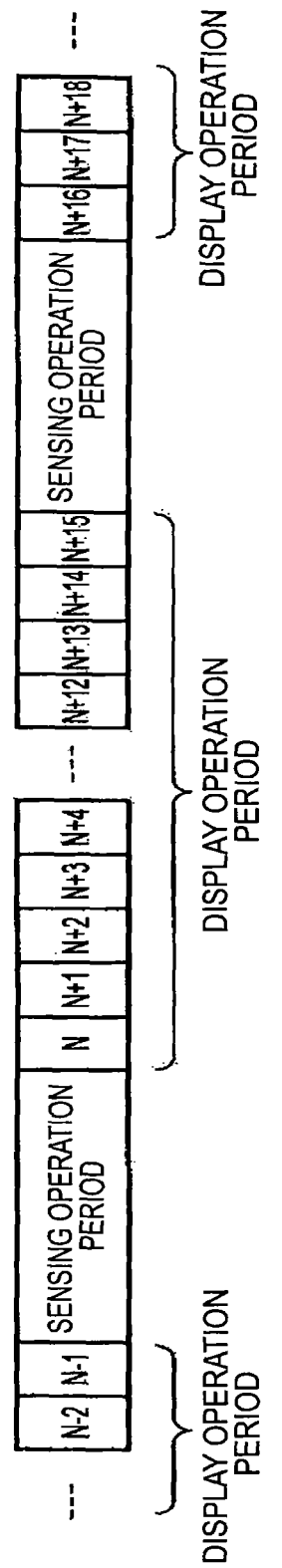
FIG. 5 is a figure showing a time sharing driving method of the display operation and the sensing operation in the prior art.

FIG. 5 is a figure showing the time sharing driving method of the display operation and sensing operation of the prior art.

In the display device 1, a detection signal is read from the corresponding sensing circuit 12 each time display signals are held in the pixels PX of 16 row lines. In FIG. 5, after writing the display signal of the (N−1)th row line at the last of the display operation period, the detection signal is read in the sensing operation period. In the next display operation period, the display signals of the Nth row line—the (N+15)th row line are written, and the detection signals are read out from the corresponding sensing circuit 12 in the sensing operation period. Further, in a succeeding display operation period, the writing of the display signals of the (N+16) th row line—the (N+31) th row line is performed.

Figure 6:
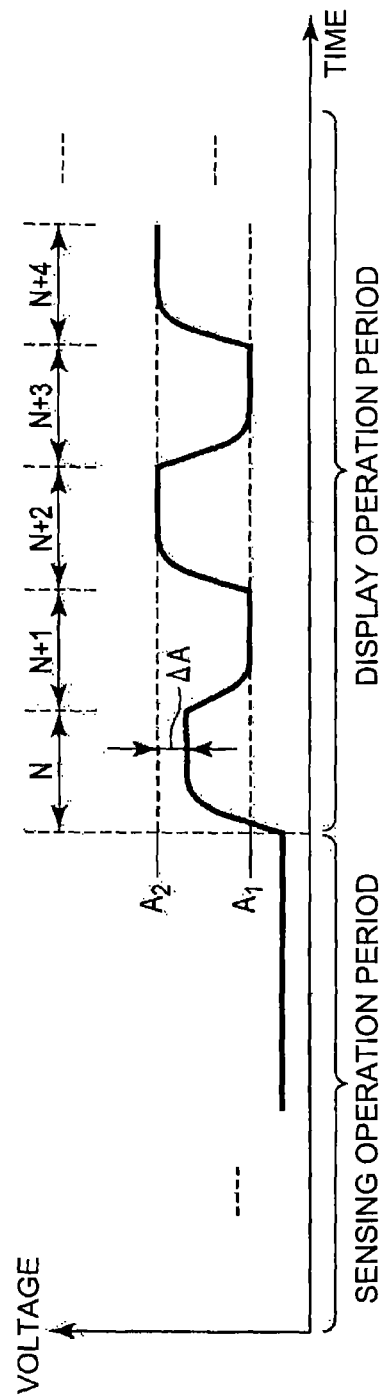
FIG. 6 is a figure showing a voltage of a signal line at the time of the display operation and the sensing operation in the prior art.

FIG. 6 is a figure showing a voltage of the signal line SL at a time of the prior art display operation and sensing operation of the prior art.

The reading-out operation of the detected signal from the sensing circuit 12 is performed before the writing of the display signals of the Nth row line is performed. In the sensing operation period, a voltage (precharge voltage) required for operating the sensing circuit 12 or a voltage (reading-out voltage) corresponding to the detected signal read from the sensing circuit 12 is written in the signal line SL. The voltages required for the operation of the sensing circuit 12 or the voltage corresponding to the detected signal read from the sensing circuit 12 are voltages with smaller values than the voltage range between A1 and A2 used for the usual display operation. In addition, the voltages of the Nth row line, the (N+2)th row line, the (N+4)th row line, . . . , differ from the voltages of the (N+1)th row line, the (N+3)th row line, . . . , because the display device performs an alternating current drive corresponding to the above-mentioned polarity-inversion driving system.

Therefore, after the display operation period has started, at the starting time of the write-in operation of the display signal of the first row line (Nth row line), the voltage of the signal line SL differs from those at the time of the writing of the display signals in other row lines. Accordingly, after the display operation period has started, in the writing of the display signal of the first row line (Nth row line), a voltage difference (ΔA) in an attainment voltage arises after writing. The difference of the attainment voltage turns into a difference of the gradation of the liquid crystal panel, and is sighted. Since the sensing circuit 12 operates every 16 row line, a display row line having different gradation appears every 16 line, and this is sighted as unevenness in the shape of a stripe.

Figure 7:
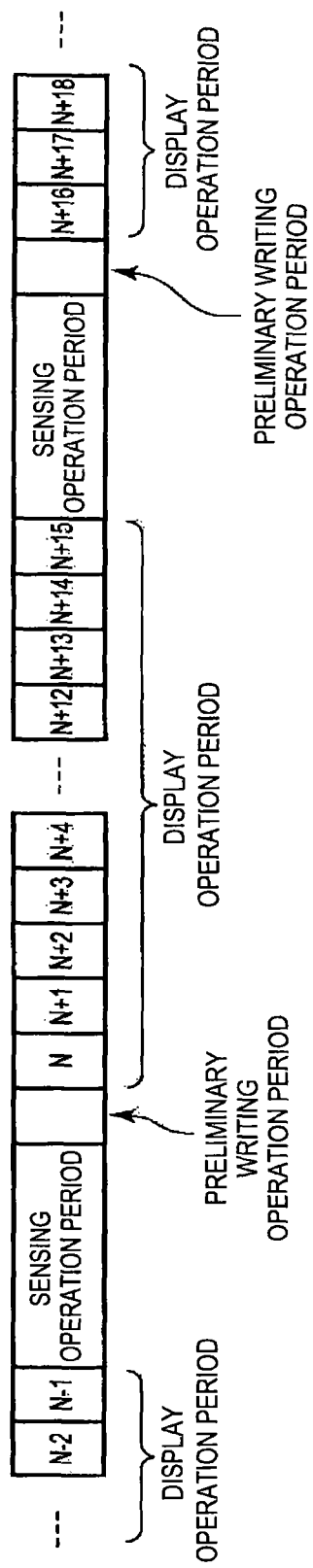
FIG. 7 is a figure showing the time sharing driving method of the display operation and the sensing operation in the display device according to the embodiment.

FIG. 7 is a figure showing the time sharing driving method of the display operation and the sensing operation according to this embodiment.

In the display device 1, a preliminary write-in operation period is provided before writing the first display signal in the Nth row line after the sensing operation period. In the preliminary write-in operation period, the voltage having a voltage range between A1 and A2 used for the usual display is written in the signal line SL.

Figure 8:
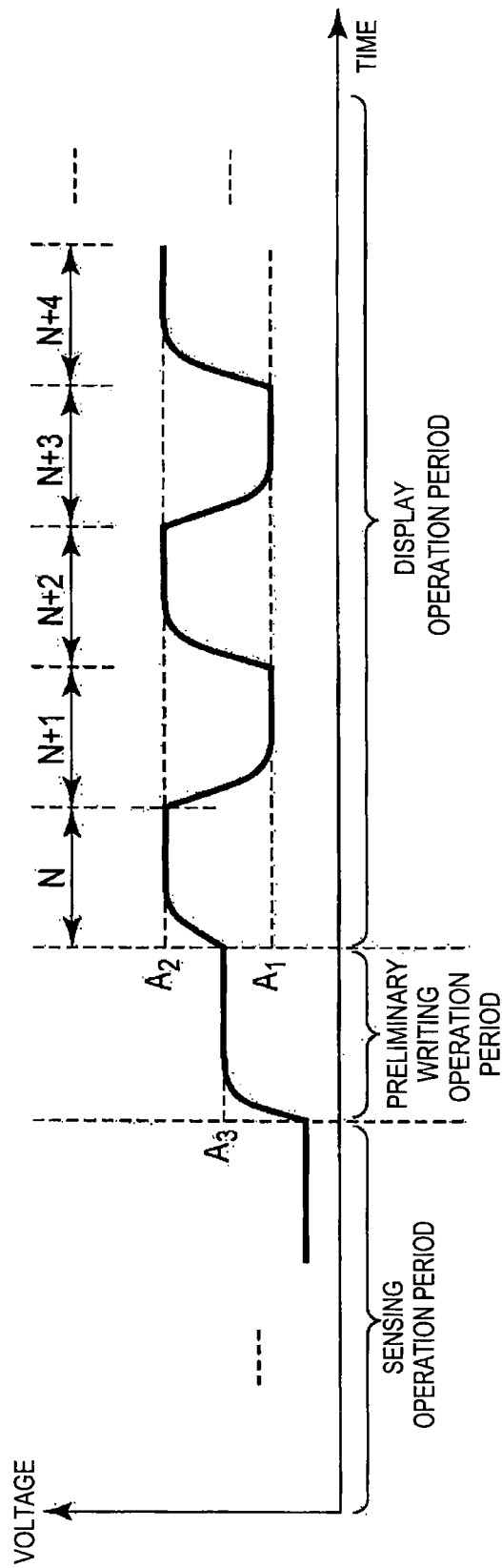
FIG. 8 is a figure showing the voltage of the signal line at the time of the display operation and the sensing operation in the display device according to the embodiment.

FIG. 8 is a figure showing the voltage of the signal line SL at the time of the display operation and the sensing operation in the display device according to this embodiment.

The above-mentioned preliminary write-in operation is performed before the writing of the display signal of the Nth row line is performed. In the preliminary write-in operation period, a voltage A3 within the range between A1 and A2 used for the usual display is written in the signal line SL. Therefore, the voltage of the signal line SL before the writing to the Nth row line can be made into the voltage within the voltage range used for the usual display like the state before the writing to other row lines. As a result, the difference of the above-mentioned gradation is eliminated, and the unevenness in the shape of a stripe is not sighted. Thereby, the degradation of the display grace can be prevented.

In addition, in the preliminary write-in operation period, although the voltage A3 within the voltage range used for the usual display is written in the signal line SL, the voltage A3 is not written in the pixel PX. The preliminary writing operation is performed so that the potential of the signal line SL is set to the voltage within the voltage range used for the display.

Figure 9:
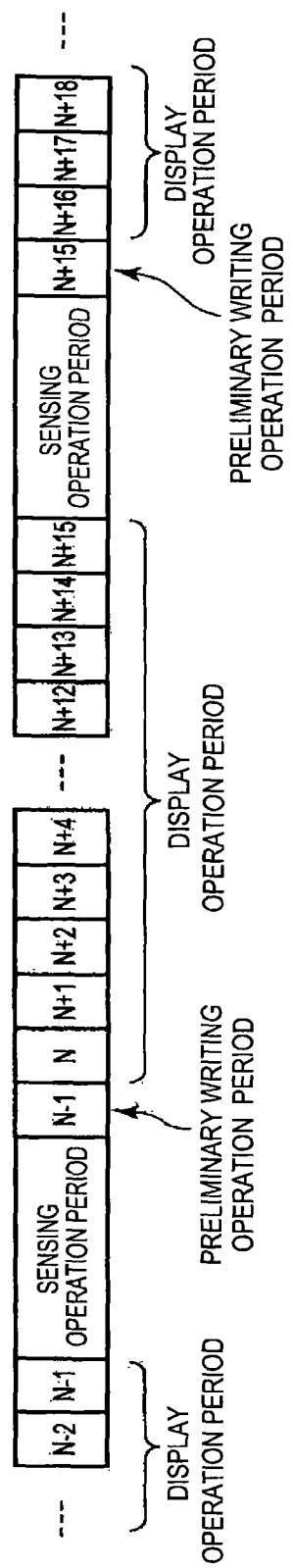
FIG. 9 is a figure showing the time sharing driving method of the display operation and the sensing operation in the display device according to a modification of the embodiment.

FIG. 9 is a figure showing the time sharing driving method of the display operation and the sensing operation in the display device according to a modification of this embodiment.

In the display device 1 according to the modification of the embodiment, the preliminary write-in operation period is provided before writing the first display signal to the Nth row line after the sensing operation period. In this preliminary write-in operation period, the voltage used for the last display of the last (N−1)th row line in the display operation period is written in the signal line SL.

Figure 10:
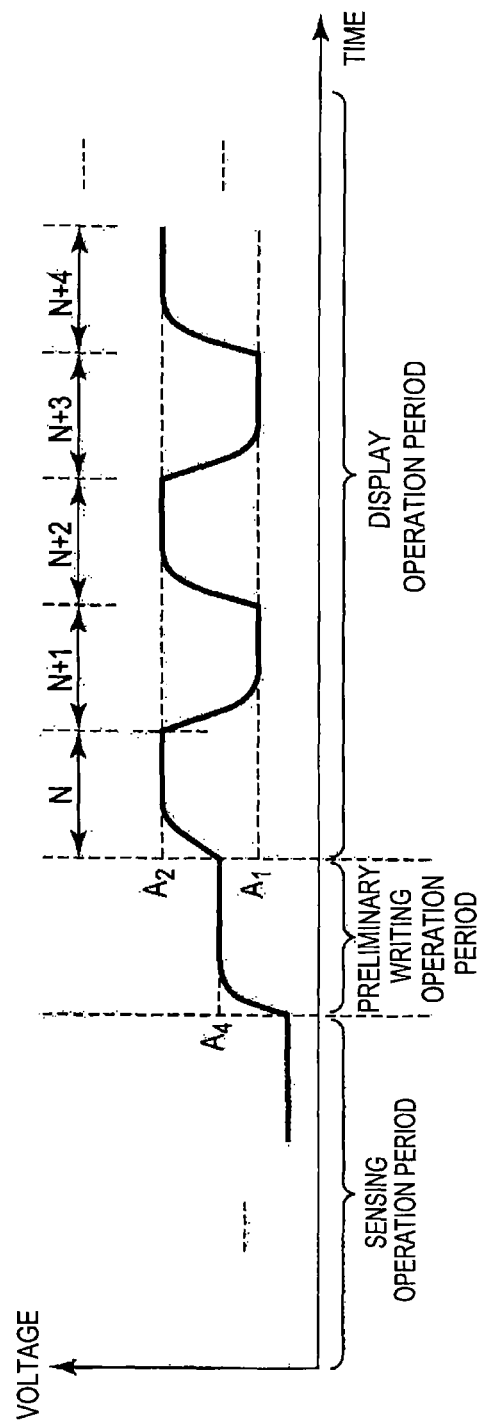
FIG. 10 is a figure showing the voltage of the signal line at the time of the display operation and the sensing operation in the display device according to the modification of the embodiment.

FIG. 10 is a figure showing the voltage of the signal line SL at the time of the display operation and the sensing operation in the display device according to the above modification of the embodiment.

The preliminary write-in operation is performed before the writing of the display signal of the Nth row line is performed. In the preliminary write-in operation period, a voltage A4 which was used for the display of the last (N−1)th row line in the previous display operation is written to the signal line SL. Therefore, the voltage of the signal line SL before the writing to the Nth row line can be made into the voltage within the voltage range used for the usual display like the state before the writing to other row lines. As a result, the above-mentioned difference of the gradation is eliminated, and the unevenness in the shape of a stripe is not sighted. Thereby, the degradation of the display grace can be prevented.

In addition, the voltage A4 used for the last display, i.e., the display in the (N−1)th row line in the previous display operation period may be held in a buffer memory (not illustrated) provided in the circuit substrate 60, and the held voltage A4 may be used.

In addition, in the preliminary write-in operation period, although the voltage A4 within the voltage range used for the display (N−1)th row line is written in the signal line SL, the voltage A4 is not written in the pixel PX. The preliminary writing operation is performed so that the potential of the signal line SL is set to the voltage within the voltage range used for the display.

Figure 11:
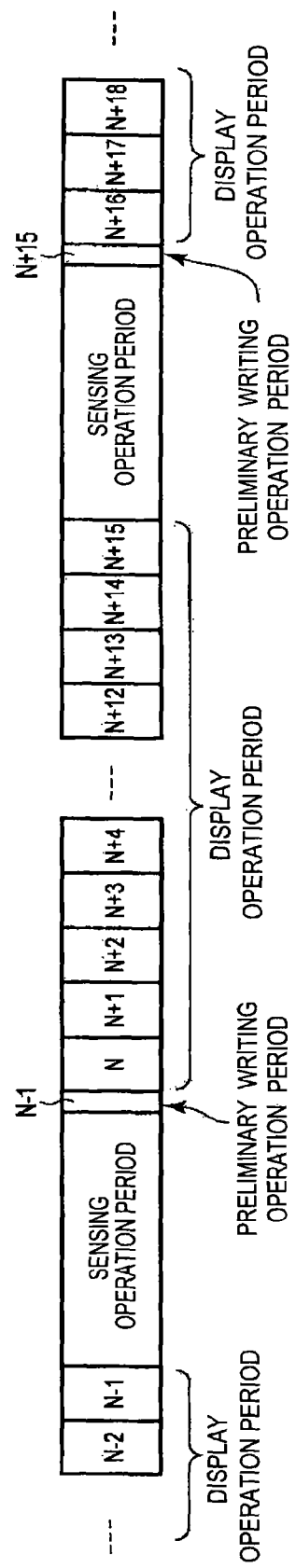
FIG. 11 is a figure showing the time sharing driving method of the display operation and the sensing operation in the display device according to other modification according to the embodiment.

FIG. 11 is a figure showing a time sharing driving method of the display operation and the sensing operation in other modification of the embodiment.

In the display device 1 according to the modification of the embodiment, a preliminary write-in operation period is provided before writing the first display signal to the Nth row line after the sensing operation period. In this preliminary write-in operation period, the voltage used for the last display, i.e., the display of the (N-1)th row line in the previous display operation period is written in the signal line SL.

Further, in this case, since the preliminary writing operation is for setting the potential of the signal line SL to the voltage within the voltage range used for the display, the period for preliminary writing may be made shorter than the time which is needed for the writing of the usual display. When the period assigned to the display operation and the sensing operation becomes shorter, reduction of the period for the display operation and the sensing operation can be made into the minimum by shortening the period which is needed to perform the preliminary writing operation.

The voltage used in the preliminary write-in operation period is not restricted to the voltage used for the last display, i.e., the display of the (N-1)th row line in the previous display operation period, but may be the voltage used for the display of an arbitrary row line in the past display operation period. Moreover, the voltage may be that used for the first display, i.e., the display of the Nth row line in the beginning of the succeeding display operation period.

Also in the above modification, the time for the preliminary writing operation may made shorter than that for the writing operation of the usual display.

In the above embodiments, although the case where the sensor operates every 16 row line was explained, the embodiments can be applied to the case where the sensor operates for every M row line (arbitrary numbers between 1 and the number of the maximum row lines), and the same effect is achieved.

Although the display device 1 according to the above-mentioned embodiment is formed of the liquid crystal display device, the display device 1 according to the embodiment is not limited to the liquid crystal display device. For example, the display device 1 may be formed of an organic electroluminescence (electroluminescence) display panel or an inorganic EL display panel.

The display device 1 according to the above-mentioned embodiment may be formed of the liquid crystal display device which adopts display modes, such as a TN (Twisted Nematic) mode, an IPS mode, and an OCB (Optically Compensated Bend) mode.

The display device according to the above-mentioned embodiment is also applicable to a color display device and a monochrome type display device.

In the above sensing circuit 12, the reading-out switch SWC and the reading-out gate line RG may be eliminated. In the case, the drain electrode of the amplification switch SWB is electrically connected with the reading-out line ROL.

The coupling pulse is not necessarily supplied from the coupling line CPL. For example, a pulse line arranged in parallel with the signal line SL may be added as the coupling line.

In addition, the timing controller TCON may not be restricted to the structure in which the timing controller TCON is formed in the circuit substrate 60, but may be formed outside. For example, the timing controller TCON may be formed on the array substrate.

The amplification switch SWB is not restricted to the form of the embodiment, but may be constituted using an amplifier.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device having a touch panel function, comprising:
    a plurality of pixel circuits arranged in a matrix shape;
    a plurality of sensing circuits arranged in a region between the adjacent pixel circuits for reading out a magnitude of coupling capacitance;
    a plurality of scanning lines arranged in a row direction along which the plurality of pixel circuits extend for use of the pixel circuits and the sensing circuits;
    a plurality of signal lines arranged in a column direction along which the plurality of pixel circuits extend for use of the pixel circuits and the sensing circuits, some of the signal lines being commonly used for the pixel circuits and the sensing circuits;
    a display driver for writing a display signal in the pixel circuit every row line by driving the plurality of scanning lines and signal lines in a display operation period;
    a sensing driver for sensing a signal showing magnitude of the coupling capacitance from the sensing circuit every row line by driving the plurality of scanning lines and signal lines in a sensing operation period; and
    a control portion for controlling the display driver and the sensing driver, wherein
    while the display operation period and the sensing operation period are repeated in turns,
    while the sensing operation is performed, a voltage with a smaller value than a voltage range used for the display operation is written into the signal lines,
    a voltage in the range used for the displaying operation is written into the signal line in a preliminary writing operation period between after the sensing operation period and before the display operation period.

2. The display device having a touch panel function according to claim 1, wherein the voltage in the range used for the displaying operation written in the preliminary writing operation period is a voltage written in the pixel circuits of the last row line in a previous display operation period.

3. The display device having a touch panel function according to claim 1, wherein the voltage in the range used for the displaying operation written in the preliminary operation period is a voltage written in the pixel circuits of the first row line in a succeeding display operation period.

4. The display device having a touch panel function according to claim 1, wherein the voltage in the range used for the displaying operation written in the preliminary operation period is an arbitrarily selected voltage written in the pixel circuits in any one of the previous display operation periods.

5. The display device having a touch panel function according to claim 1, wherein the time for writing the voltage in the range used for the displaying operation in the signal line in the preliminary writing operation period is shorter the time for writing the voltage in the pixel circuit in the display operation period.

6. The display device having a touch panel function according to claim 1, wherein the display device is constituted by a liquid crystal display device or an Electroluminescence display device.

7. The display device having a touch panel function according to claim 6, wherein the liquid crystal display device uses one of a TN (Twisted Nematic) mode, an IPS mode, and an OCB (Optically Compensated Bend) mode.

8. The display device having a touch panel function according to claim 1, wherein the control portion performs coordinate calculation based on the sensed signal by the sensing circuit, and detects a coordinate position where a fingertip or a nib contacted.

9. The display device having a touch panel function according to claim 1, further comprising a circuit substrate, wherein the circuit substrate includes a multiplexer MUX, a D/A conversion portion DAC, an A/D conversion portion ADC, an interface portion I/F, and a timing controller TCONT.

10. The display device having a touch panel function according to claim 9, wherein the timing controller TCONT controls the operation of the multiplexer MUX, the D/A conversion portion DAC, and the A/D conversion portion ADC.

* * * * *